Oct. 2, 1934.  L. SANCHEZ-VELLO  1,975,737
PREVENTION OF AIR BUBBLES IN GLASS
Original Filed Dec. 23, 1931
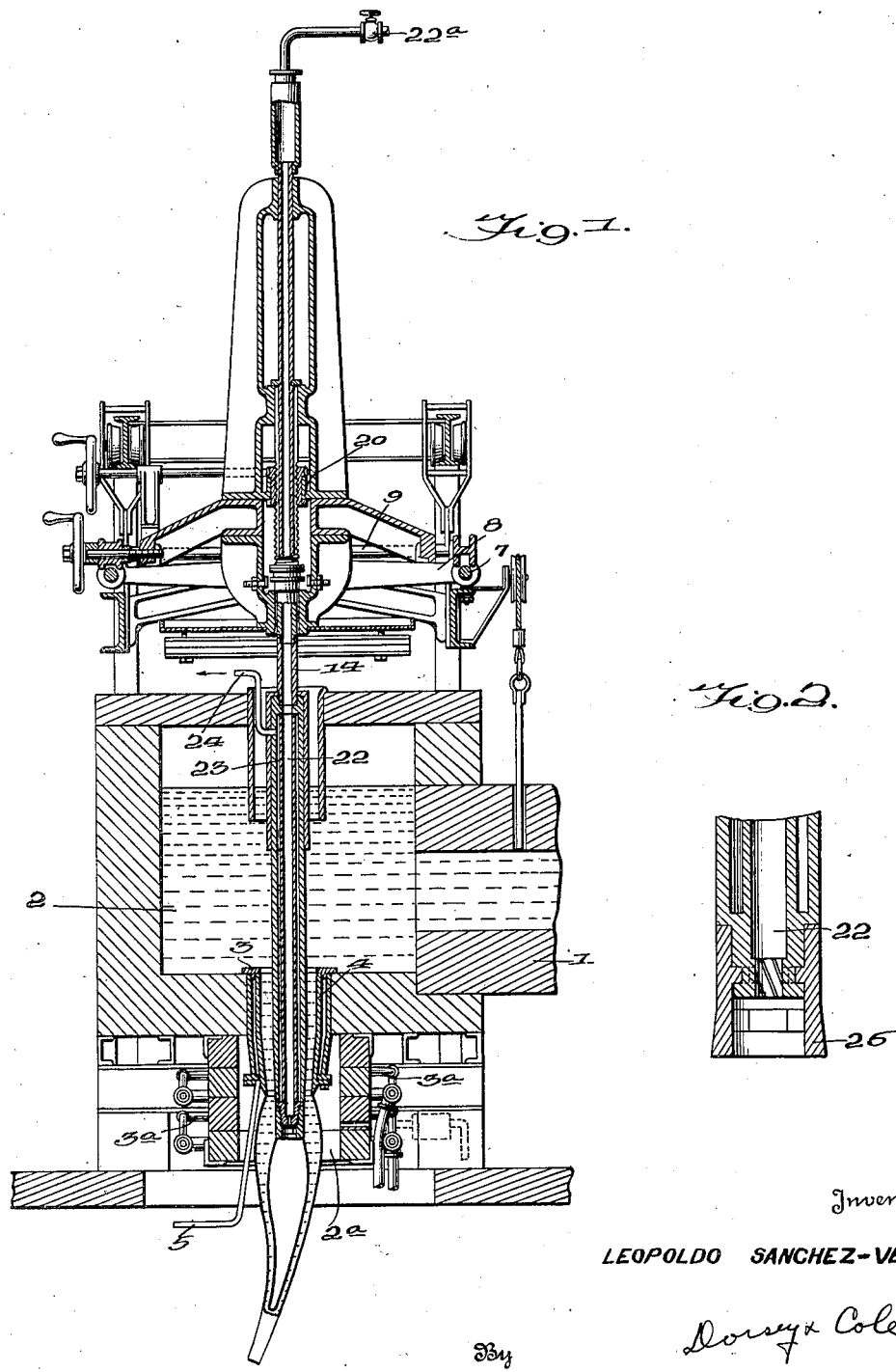
Inventor
LEOPOLDO SANCHEZ-VELLO
By Dorsey & Cole
Attorney Patented Oct. 2, 1934

1,975,737

UNITED STATES PATENT OFFICE 1,975,737

PREVENTION OF AIR BUBBLES IN GLASS

Leopoldo Sanchez-Vello, Nogent - Sur - Marne, France, assignor to Maatschappij tot Beheer en Exploitatie van Octrooien, The Hague, Netherlands Original application December 23, 1931, Serial No. 582,860. Divided and this application November 9, 1933, Serial No. 697,351. In France June 8, 1929

10 Claims. (Cl. 49—17.1)

This application is filed as a division of my original application filed December 23, 1931, serially numbered 582,860, to claim that invention therein which relates to the prevention of air bubbles in a body of glass moving over a surface in contact therewith. Specifically the invention is shown as embodied in a tube or rod-drawing machine and is claimed in certain of the following claims in that structure.

For this purpose it comprises a glass-contacting part or parts, specifically in the form of a mandrel and/or an outlet, of metal, and provided with means for applying a vacuum behind the glass-contacting surface thereof to prevent air being drawn to the glass-contacting surface, and to thus prevent striations or bubbles in the glass.

Referring to the accompanying drawing in which corresponding parts are designated by corresponding marks of reference, Figure 1 is a vertical longitudinal section of a tube drawing mechanism embodying my invention.

Figure 2 is an enlarged section through a mandrel containing my invention.

From a suitable melting furnace 1 projects the forehearth 2, the temperature in which may be controllably varied as is well known. The bottom of the forehearth has a removable orifice bushing 3 of a suitable metal which is covered by molten glass when the device is in operation. This bushing has an annular cavity 4 in its side walls, connected by the pipe 5 with a suitable source of vacuum. Thus the inner surface of the orifice which is in contact with the glass, is surrounded by a vacuum chamber which not only intercepts the air in its passage through the bushing but draws occluded air in the metal into the chamber instead of permitting it to be drawn to the glass surface. The lower end of the bushing projects to below the floor of the forehearth and enters the upper part of a chamber 2a having an open bottom, the temperature in which is controllable by means of burners 3a directing flame around the glass issuing from the forehearth.

The mandrel 14 may be of metal, and when tubing is to be made is provided with a central longitudinal bore 22 through which air under pressure, determined by the valve 22a may be passed. This bore may be omitted when cane is to be produced. I will in the following describe my invention as applied to the production of tubing, but it will be understood that with this change, what is said is applicable to the production of cane.

If desired the mandrel may have a chamber 23, surrounding the bore 22, and connected with a vacuum pipe 24, whereby the air under pressure in the bore 22, is prevented from passing through the metal to the glass contacting surface thereof.

The mandrel is shown as terminating at its lower end in a detachable tip 25, the diameter of which is suitable for the size of the tube to be formed.

Having thus described my invention what I claim and desire to secure by United States Letters Patent is:

1. The hereinbefore described process of suppressing air bubbles in glass moving from off a surface which comprises maintaining a sub-atmospheric pressure back of such surface.

2. The hereinbefore described process of suppressing air bubbles in glass moving from off a metallic surface which comprises maintaining a sub-atmospheric pressure back of such surface.

3. The hereinbefore described process of suppressing air bubbles in rod formed by feeding glass from off a surface which comprises maintaining a sub-atmospheric pressure back of such surface.

4. In an apparatus for forming glass articles the combination of a member over the surface of which the glass is fed and having a chamber back of such surface and means for maintaining a sub-atmospheric pressure in said chamber.

5. In a rod forming mechanism, the combination with an orifice bushing, of means for maintaining sub-atmospheric pressure around and adjacent to the interior walls of the bushing.

6. In a rod forming mechanism, the combination with a bushing having a chamber therein surrounding the interior walls thereof, of means for maintaining sub-atmospheric pressure in the chamber.

7. In a rod forming mechanism, the combination with a mandrel around which glass issues, of a chamber in the mandrel, and means for maintaining sub-atmospheric pressure in the chamber.

8. In a tube forming mechanism, the combination with a mandrel around which the glass issues, a bore in the mandrel for creating super-atmospheric pressure at the root of the tube formed thereby, and having a chamber between the bore and the exterior surface of the mandrel and means for maintaining a sub-atmospheric pressure in the chamber.

9. In a rod forming mechanism, the combination with an orifice bushing, of means for maintaining a sub-atmospheric pressure outside of and adjacent to the interior walls thereof, a mandrel in the bushing and around which the glass issues having a chamber therein, and means for maintaining sub-atmospheric pressure in the chamber.

10. In a tube forming mechanism, the combination with an orifice bushing having a chamber therein surrounding the interior walls thereof, of a mandrel projecting within the bushing having a bore therein for creating super-atmospheric pressure in the root of the tube formed thereby and having a chamber between the bore and the exterior surface of the mandrel and means for maintaining sub-atmospheric pressure in the chamber.

LEOPOLDO SANCHEZ-VELLO.